United States Patent
Sandberg

(10) Patent No.: US 10,873,939 B2
(45) Date of Patent: Dec. 22, 2020

(54) SELECTING A MODULATION AND CODING SCHEME AND A TRANSMIT BLOCK SIZE IN LONG TERM EVOLUTION

(71) Applicant: CommScope Technologies LLC, Hickory, NC (US)

(72) Inventor: Stuart D. Sandberg, Acton, MA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/381,720

(22) Filed: Apr. 11, 2019

(65) Prior Publication Data

US 2019/0327730 A1    Oct. 24, 2019

Related U.S. Application Data

(60) Provisional application No. 62/659,634, filed on Apr. 18, 2018.

(51) Int. Cl.
*H04W 72/04*    (2009.01)
*H04L 5/14*    (2006.01)

(52) U.S. Cl.
CPC .......... *H04W 72/0446* (2013.01); *H04L 5/14* (2013.01)

(58) Field of Classification Search
CPC .............................. H04W 72/0446; H04L 5/14
USPC ....................................................... 370/280
See application file for complete search history.

(56) References Cited

U.S. PATENT DOCUMENTS

| | | |
|---|---|---|
| 2013/0322241 A1 | 12/2013 | Fantaye et al. |
| 2016/0007357 A1 | 1/2016 | Yano et al. |
| 2017/0064689 A1 | 3/2017 | Nimbalker et al. |
| 2017/0105200 A1* | 4/2017 | Larsson .............. H04W 74/006 |
| 2018/0084572 A1 | 3/2018 | You et al. |
| 2019/0081745 A1* | 3/2019 | Qin ........................ H04L 1/1812 |
| 2019/0149287 A1* | 5/2019 | Cheng ................... H04L 5/0044 370/280 |

OTHER PUBLICATIONS

International Searching Authority, "International Search Report and Written Opinion from PCT Application No. PCT/US2019/026984 dated Jul. 29, 2019", from Foreign Counterpart to U.S. Appl. No. 16/381,720, pp. 1-10, Published: WO.
ETSI, "ETSI TS 136 213 V14.2.0 LTE; Evolved Universal Terrestrial Radio Access (E-UTRA); Physical layer procedures (3GPP TS 36.213 version 14.2.0 Release 14)", Apr. 2017, pp. 1-456.

* cited by examiner

*Primary Examiner* — Faisal Choudhury
(74) *Attorney, Agent, or Firm* — Fogg & Powers LLC

(57) ABSTRACT

A base station for selecting a modulation and coding scheme (MCS) and a total block size (TBS) for a UE is provided. The base station includes a processor and memory storing instructions. The instructions are executable to map a nominal MCS to a TBS index and determine a nominal TBS per resource block value based on the TBS index. The instructions are also executable to determine a target TBS based on the nominal TBS per resource block value and a number of resource blocks allocated to the UE. The instructions are also executable to determine a customized TBS, from a plurality of predefined TBSs, that is closest to the target TBS. The instructions are also executable to map the customized TBS to a customized MCS. The instructions are also executable to use the customized TBS and the customized MCS to transmit to the UE during a downlink transmission time interval.

20 Claims, 8 Drawing Sheets

SELECTING A MODULATION AND CODING SCHEME AND A TRANSMIT BLOCK SIZE IN LONG TERM EVOLUTION

CROSS-REFERENCE TO RELATED APPLICATIONS

This application claims priority to the following patent application, which is hereby incorporated by reference: U.S. Provisional Patent Application Ser. No. 62/659,634 filed on Apr. 18, 2018 and entitled "SELECTING A MODULATION AND CODING SCHEME AND A TRANSMIT BLOCK SIZE IN LONG TERM EVOLUTION".

BACKGROUND

Due to the explosive growth in mobile broadband traffic and its concomitant strain on limited spectrum resources, the Federal Communications Commission has adopted rules to allow commercial shared use of 150 MHz of spectrum in the 3550-3700 MHz (3.5 GHz) band for licensed and unlicensed use of the 3.5 GHz band for a wide variety of services.

Citizens Broadband Radio service (CBRS) is a commercial radio service in 3.5 GHz in the U.S. A CBRS system may be used for Long-Term Evolution (LTE) services. In the U.S., CBRS systems may use time-division duplexing (TDD) to allocate bandwidth between the uplink and downlink. In a CBRS/TDD system, physical downlink shared channel (PDSCH) data may be sent in special subframes or in normal downlink subframes.

During link adaptation, a base station may select a modulation and coding scheme (MCS) and a transmit block size (TBS), based on a variety of system parameters, to communicate with a user equipment (UE). However, special subframes may carry fewer symbols than normal subframes. Furthermore, the amount of control data carried in each resource block and the number of resource blocks allocated to a UE may effect a large variation in rate efficiency for a given MCS. This may result in inefficient link adaptation, e.g., selecting an MCS and/or TBS that does not match the conditions of a wireless channel very well. Inefficient link adaptation can result in poor throughput and inefficient use of resources.

In order to improve the efficiency of link adaptation, there is a need for improving the selection of an MCS and a TBS in LTE.

SUMMARY

A base station for selecting a modulation and coding scheme (MCS) and a total block size (TBS) for a user equipment (UE) is provided. The base station includes a processor and memory in electronic communication with the processor. Instructions are stored in the memory. The instructions are executable to map a nominal MCS to a TBS index and determine a nominal TBS per resource block value based on the TBS index. The instructions are also executable to determine a target TBS based on the nominal TBS per resource block value and a number of resource blocks allocated to the UE. The instructions are also executable to determine a customized TBS, from a plurality of predefined TBSs, that is closest to the target TBS. The instructions are also executable to map the customized TBS to a customized MCS. The instructions are also executable to use the customized TBS and the customized MCS to transmit to the UE during a downlink transmission time interval (TTI).

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
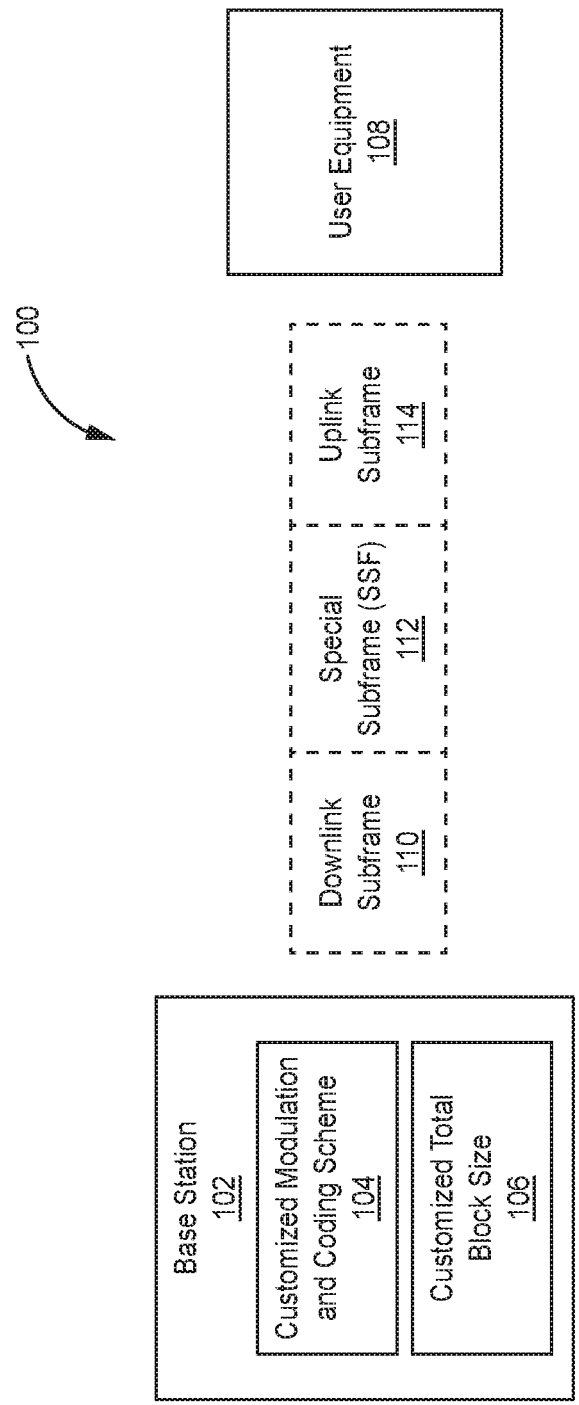
FIG. 1A is block diagram illustrating an example system for selecting a modulation and coding scheme (MCS) and a transmit block size (TB S) in Long-Term Evolution (LTE)

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In a Citizens Broadband Radio service (CBRS) system using time-division duplexing (TDD), physical downlink shared channel (PDSCH) data may be sent in the downlink pilot time slot (DwPTS) of special subframes (SSFs) as well as in normal downlink subframes (NSFs). For CBRS, the DwPTS length may be fixed at 10 symbols, while a normal downlink subframe may be 14 symbols in length. Therefore, to maintain the same rate-efficiency for DwPTS as for normal downlink subframes, a transport block size (TBS) must be smaller for DwPTS than for normal subframes, i.e., corresponding to the shorter duration of the DwPTS.

A TBS may be selected for a UE in a given transmission time interval (TTI) based on a TBS index (Itbs) and the number of resource blocks allocated ($N_{rbs\_alloc}$) for the UE, e.g., using Table 7.1.7.2.1-1 in Technical Specification 3GPP TS 36.213 V15.0.0 (2017-12) (referred to herein as "3GPP TS 36.213"). It should be noted that "Nrbs_alloc" may be used interchangeably with "$N_{prb}$" herein to refer to a number of resource blocks allocated to a UE.

Section 7.1.7 of 3GPP TS 36.213 provides for reducing the TBS used in DwPTS by mapping the actual $N_{rbs\_alloc}$ to a smaller pseudo-value $N'_{rbs\_alloc}=\max\{\text{floor}(N_{rbs\_alloc}*0.75),1\}$, used only for the purpose of table lookup of the TBS in DwPTS. However, the resulting rate-efficiency (e.g., measured in bps/Hz) vs MCS may have a large variation depending on the selected MCS, $N_{rbs\_alloc}$, and a control format indicator (CFI). In other words, the number of symbols used for control data in each resource block (i.e., the CFI) and the number of resource blocks allocated to a UE, among other factors, may effect a large variation in rate efficiency for a given MCS in a special subframe. The variation of rate-efficiency may be also greater for higher values of MCS.

Furthermore, even in normal downlink subframes, the MCS/TBS selection approach described in Section 7.1.7 of 3GPP TS 36.213 (direct table lookup of TBS given MCS and $N_{rbs\_alloc}$) may result in significant variation. For example, for a channel supporting a given rate-efficiency, the supported MCS varies significantly with CFI and $N_{rbs\_alloc}$, leading to inefficient link adaptation and a corresponding reduction in throughput.

Therefore, inefficient link adaptation may reduce efficiency of the system overall. For example, if the base station attempts to use a higher rate-efficiency than channel conditions support due to a poorly selected MCS and/or TBS, a target block error rate may be exceeded. This may result in correspondingly lower downlink throughput. Alternatively, if the base station attempts to use a rate-efficiency lower than what channel conditions support due to a poorly selected MCS and/or TBS, downlink throughput may also be unnecessarily low.

In contrast to the direct table lookup described in Section 7.1.7 of 3GPP TS 36.213, the present systems and methods may improve the selection of an MCS and a TBS. The improved selection of an MCS and a TBS may include tracking a nominal MCS. However, instead of selecting the nominal MCS for the UE, an MCS, TBS pair (where the MCS is generally close to the nominal MCS) may be selected such that, given the actual parameters of the TTI, the resulting rate-efficiency for the selected MCS, TBS pair is close to the rate-efficiency for the nominal MCS. The improved selection of an MCS and a TBS described herein may be more customized, compared to the direct table lookup approach described in Section 7.1.7 of 3GPP TS 36.213, because the improved selection of an MCS and a TBS described herein may account for the number of resource blocks allocated ($N_{rbs\_alloc}$), the value of CFI, and whether the subframe is a special subframe or a normal downlink subframe. This customization may result in an MCS, TBS pair that more closely match the channel conditions, which may increase downlink throughput compared with the direct table lookup described in Section 7.1.7 of 3GPP TS 36.213.

FIG. 1A is a block diagram illustrating an example system 100 for selecting a modulation and coding scheme (MCS) and a transmit block size (TBS) in Long-Term Evolution (LTE). In one configuration, the system 100 may be a Citizens Broadband Radio service (CBRS) that implements an LTE system. The system 100 may include a base station 102 and a user equipment (UE) 108.

The base station 102 may also be referred to as, and may include the functionality of, an access point, base transceiver station (BTS), a broadcast transmitter, an eNodeB or eNB. The base station 102 may provides communication coverage for a particular geographic area. A base station 102 may provide communication coverage for one or more UEs 108.

In one configuration, the base station 102 may be implemented as a centralized radio access network (C-RAN). The C-RAN may include at least one baseband controller that communicates with multiple geographically separate radio points (RPs) in order to provide wireless service to various items of user equipment (UEs).

Figure 1B:
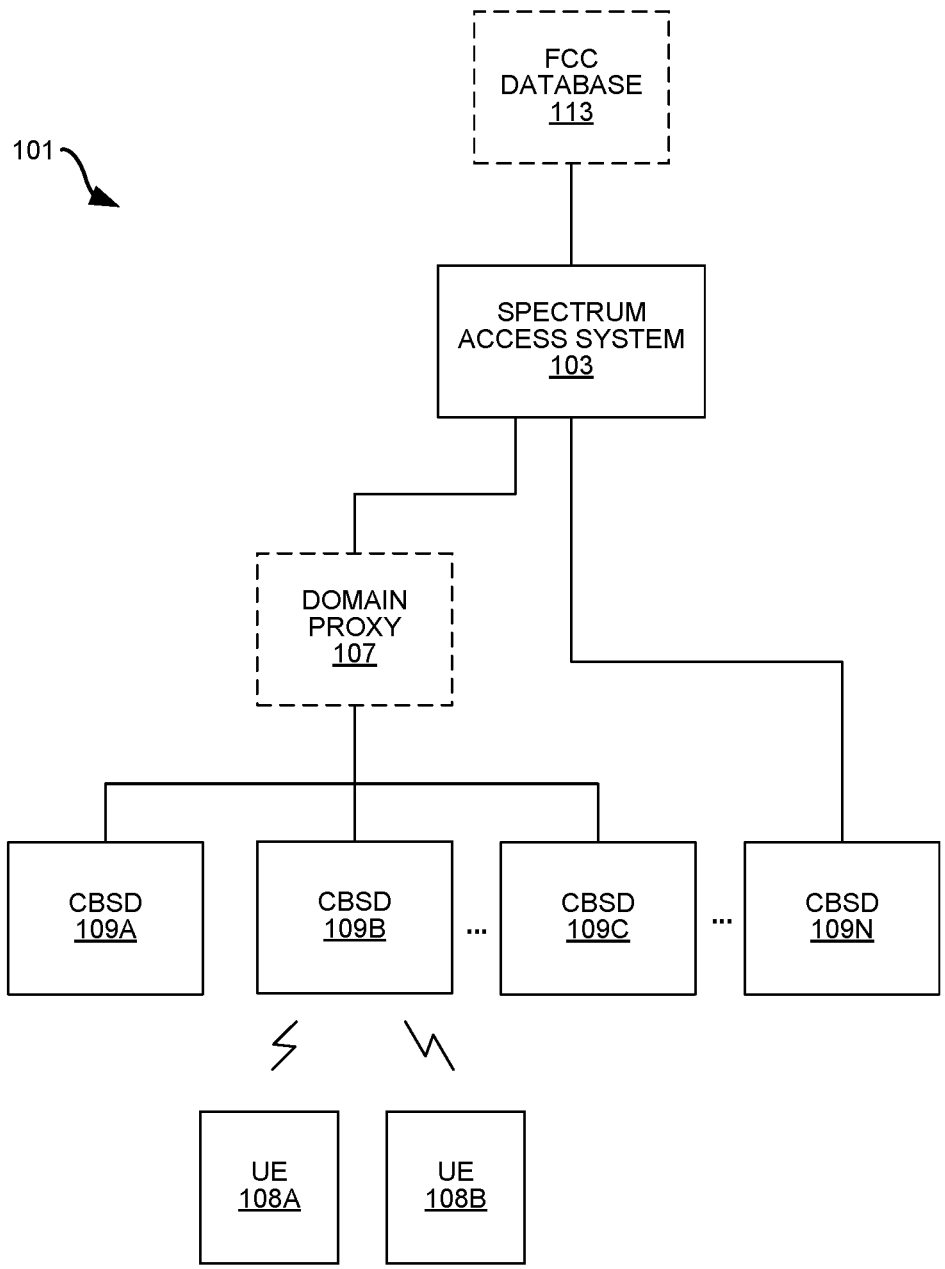
FIG. 1B is a block diagram illustrating an example Citizens Broadband Radio service (CBRS) system.

Additionally or alternatively, the base station 102 may be a Citizens Broadband Radio Service device (CBSD) in a CBRS system. FIG. 1B, below, illustrates an example CBRS system.

The UE 108 may also be referred to as, and may include the functionality of, a terminal, an access terminal, a subscriber unit, a station, etc. The UE 108 may be a cellular phone, a smartphone, a wireless modem, a tablet computer, a laptop computer, a wireless sensor, etc. A UE 108 may communicate with zero, one or multiple base stations 102 on the downlink and/or uplink at any given moment.

The system 100 may use time-division duplexing (TDD) to allocate bandwidth between the downlink and the uplink. In TDD, uplink data is separated in time from, but transmitted in the same frequency region as, downlink data. This enables asymmetric allocation of resources to downlink data compared to uplink data. Each TDD frame may be 10 ms long and may be divided into 10 subframes (each being 1 ms long). There may be multiple (e.g., seven) different possible uplink/downlink configurations for the frame. The downlink/uplink ratio in a frame can vary from 1/3 (frame configuration=0) to 8/1 (frame configuration=5).

The first subframe may be a downlink subframe 110 that carries control data and PDSCH data. The downlink subframe 110 may also be referred to as a "normal subframe" or a "normal downlink subframe" to distinguish it from a "special subframe". The downlink subframe 110 may be 14 symbols long.

When transitioning from a downlink subframe 110 to an uplink subframe 114, a special subframe 112 may be used. The special subframe 112 may include a downlink pilot time slot (DwPTS), a guard period (GP), and an uplink pilot time slot (UpPTS). The DwPTS 220 may carry control data and PDSCH reference symbols, and it may be 10 symbols long.

During operation, the base station 102 may track a nominal MCS for the UE 108. The MCS may indicate a code rate times a constellation size. A higher MCS may be associated with a higher throughput, while a lower MCS may be associated with a lower throughput. However, a higher MCS may also the require a higher signal to noise ratio (SNR) to support a given block error rate (e.g., 10%) than a lower MCS.

The base station 102 may determine the nominal MCS based on channel quality indicators (CQIs) reported by the UE 108. As used herein, the nominal MCS may also be referred to as a "nominal MCS index" since the nominal MCS may be used as an index in one or more lookup tables, as described below. Additionally, the nominal MCS may be represented by $I_{MCS}$ (e.g., as used in 3GPP TS 36.213) or $MCS_{nom}$ (e.g., as used in the equations below).

Specifically, to determine the $MCS_{nom}$, the base station 102 may use an SINRnom for each MCS. Each SINRnom may be the (weighted average) SINR required for a target (e.g., 10%) BLER, using that MCS with the nominal parameters $X_0$, $CFI_0$, and $Y_0$, i.e., nominal number of symbols in the TTI ($X_0$), nominal control format indicator ($CFI_0$), and number of reference symbols per resource block in PDSCH symbols ($Y_0$). The SINRs may be averaged across Nrbs=1, . . . , 110, and may be weighted. The CQI reports received from the UE 108 may be considered as quantized versions of MCSnom, and can be mapped to MCSnom directly, or mapped to a corresponding SINRest=SINRnom, with link adaptation making more frequent adjustments to SINRest based on the sequence of N/ACKs, to achieve target BLER. The current SINRest in a TTI maps to MCS-nom.

However, rather than selecting the nominal MCS (and a TBS found with the direct table lookup approach in Section 7.1.7 of 3GPP TS 36.213) for the UE 108, the base station 102 may determine a customized MCS 104 and a customized TBS 106 based on the nominal MCS. The customized modulation and coding scheme 104 and the customized total block size 106 may account for the number of resource blocks allocated ($N_{rbs\_alloc}$), the value of CFI, and whether the subframe is a normal downlink subframe 110 or a special subframe 112. The resulting TTI may have a rate-efficiency consistent with the rate-efficiency of the nominal MCS.

In the following description, various tables may be used by the system 100 to determine the customized MCS 104 and the customized TBS 106. The tables described herein should not to be taken in a limiting sense. For example, Table 1 below may be replaced or modified with Table 7.1.7.1-1 in 3GPP TS 36.213. In other words, Table 7.1.7.1-1 in 3GPP TS 36.213 may be used instead of Table 1 described below.

The base station 102 may map the nominal MCS index ($I_{mcs}$) to a TBS index ($I_{tbs}$) using Table 1.

TABLE 1

| Nominal MCS Index ($I_{mcs}$) | TBS Index ($I_{tbs}$) |
|---|---|
| 0 | $I_{tbs}$, 0 |
| 1 | $I_{tbs}$, 1 |
| 2 | $I_{tbs}$, 2 |
| 3 | $I_{tbs}$, 3 |
| 4 | $I_{tbs}$, 4 |
| ... | ... |
| N − 1 | $I_{tbs}$, N − 1 |

As is shown above, Table 1 may have N (e.g., 32) rows, and at least a column for the nominal MCS indices ($I_{mcs}$) and a column for the TBS indices ($I_{tbs}$). It should be noted that the notation $I_{tbs,0}$, $I_{tbs,1}$, etc. is used for simplicity to represent a non-negative integer. In other words, $I_{tbs,0}$ may equal 0, 1, 2, 3, etc. Additional column(s) not shown (e.g., for modulation order) may also be included in Table 1.

After the base station 102 maps the nominal MCS index ($I_{mcs}$) to a TBS index ($I_{tbs}$), the base station 102 may then determine a nominal TBS per resource block ($TBS_{nom}$) value for the UE 102. Table 2 is an example of a table that may be used to determine a nominal TBS per resource block ($TBS_{nom}$) value.

TABLE 2

| TBS Index ($I_{tbs}$) | Nominal TBS per Resource Block ($TBS_{nom}$) |
|---|---|
| $I_{tbs}$, 0 | $TBS_{nom}$, 0 |
| $I_{tbs}$, 1 | $TBS_{nom}$, 1 |
| $I_{tbs}$, 2 | $TBS_{nom}$, 2 |
| $I_{tbs}$, 3 | $TBS_{nom}$, 3 |
| $I_{tbs}$, 4 | $TBS_{nom}$, 4 |
| ... | ... |
| $I_{tbs}$, N − 1 | $TBS_{nom}$, N − 1 |

Table 2 may have N (e.g., 32) rows, and at least a column for the TBS indices ($I_{tbs}$) and a column for the nominal TBS per resource block ($TBS_{nom}$) values. The notation $TBS_{nom,0}$, $TBS_{nom,1}$, etc. is used to represent a non-negative number. Additional column(s) not shown may also be included in Table 1.

The nominal TBS per resource block ($TBS_{nom}$) values in Table 2 may be determined by averaging the TBS entries per resource block allocated (Nprb) for a given TBS index ($I_{tbs}$) in Table 3 below. Table 3 is a partial representation of Table 7.1.7.2.1-2 in 3GPP TS 36.213. Table 3 should be interpreted as including identical data as Table 7.1.7.2.1-2 in 3GPP TS 36.213, which has not been fully reproduced herein due to its size. Table 3 may be used to derive Table 2.

TABLE 3

Transport block size table

| | $N_{prb}$ | | | | |
|---|---|---|---|---|---|
| $I_{tbs}$ | 1 | 2 | 3 | ... | 110 |
| 0 | 16 | 32 | 56 | ... | 3112 |
| 1 | 24 | 56 | 88 | ... | 4008 |
| 2 | 32 | 72 | 144 | ... | 4968 |
| 3 | 40 | 104 | 176 | ... | 6456 |
| 4 | 56 | 120 | 208 | ... | 7992 |
| ... | ... | ... | ... | ... | ... |
| 34 | 1032 | 2088 | 3112 | ... | 105528 |

In one example, Table 3 may have a row for each of 38 possible values for TBS index ($I_{tbs}$), e.g., Itbs=0, 1, 2, ..., 26, 26A, 27, 28, 29, 30, 31, 32, 32A, 33, 33A, or 34. Table 3 may also have a column for 110 different values for Nprb, e.g., Nprb=0, 1, 2, ..., 110. Therefore, Table 3 may include 38*110=4,180 entries. Each entry in Table 3 (e.g., 16, 32, 56, 3112, 24, 56, etc.) may represent a transport block size (TBS). For example, the entry "104" in Table 3 indicates a TBS for a UE having a TBS index ($I_{tbs}$) of 3 (i.e., $I_{tbs}$=3) that has been allocated 2 resource blocks (i.e., Nprb=2; $N_{rbs\_alloc}$=2). Therefore, each TBS entry in Table 3 may be indexed by a TBS index ($I_{tbs}$) and an Nprb (or $N_{rbs\_alloc}$) index. The parameter "$N_{prb}$" is used in Table 3 to represent the number of resource blocks allocated to a UE 108 to be consistent with the notation used in Table 7.1.7.2.1-2 in 3GPP TS 36.213. However, the parameter "$N_{rbs\_alloc}$" may also be used herein to represent the number of resource blocks allocated to a UE 108.

To derive Table 2 from Table 3, a nominal TBS per resource block ($TBS_{nom}$) may be determined for a TBS index ($I_{tbs}$) by dividing each TBS entry in a row (indicated by the TBS index ($I_{tbs}$)) by the Nprb (or $N_{rbs\_alloc}$) index corresponding to the TBS entry, then averaging all the divided TBS entries in the row. For example, $TBS_{nom,0}$ (associated with $I_{tbs,0}$) in Table 2 may be calculated by averaging the entries in row 0 of Table 3 per resource block allocated, e.g., (16/1+32/2+56/3+ ... 3112/110)/110. Similarly, $TBS_{nom,1}$ (associated with $I_{tbs,1}$) in Table 2 may be calculated by averaging the entries in row 1 of Table 3 per resource block allocated, e.g., (24/1+56/2+88/3+ ... 4008/110)/110. Similarly, $TBS_{nom,2}$ (associated with $I_{tbs,2}$) in Table 2 may be calculated by averaging the entries in row 2 of Table 3 per resource block allocated, e.g., (32/1+72/2+144/3+ ... 4968/110)/110.

Once a nominal TBS per resource block ($TBS_{nom}$) value is determined, the base station 102 may determine an intermediate TBS by multiplying the nominal TBS per resource block ($TBS_{nom}$) value by the number of resource blocks allocated ($N_{rbs\_alloc}$). The base station 102 may scale the intermediate TBS based on actual TTI parameters and nominal TTI parameters to produce a target TBS ($TBS_{target}$). Actual TTI parameters may include the CFI used for the TTI (CFI), the number of symbols in the TTI (X), and the number of reference symbols per resource block in PDSCH symbols (Y). Nominal TTI parameters used to scale the intermediate TBS into the target TBS ($TBS_{target}$) may include $X_0=14$, $CFI_0=2$, and $Y_0=12$.

The base station 102 may also determine a customized TBS 106 that is closest to the target TBS ($TBS_{target}$) in a column of Table 3 indicated by a scaled number of resource blocks allocated ($N'_{rbs\_alloc}$). Therefore, if the target TBS ($TBS_{target}$) is 105 and the scaled number of resource blocks allocated ($N'_{rbs\_alloc}$) is 2, then the customized TBS 106 may be the TBS entry in column Nprb=2 of Table 3 (or Table 7.1.7.2.1-2 in 3GPP TS 36.213) that most closely matches 105, i.e., 104. The scaled number of resource blocks allocated ($N'_{rbs\_alloc}$) may be the number of resource blocks allocated ($N_{rbs\_alloc}$) multiplied by 0.75 for special subframes 112, but not normal downlink subframes 110. In other words, $N'_{rbs\_alloc}=N_{rbs\_alloc}$ for normal subframes. The base station 102 may then map the customized TBS 106 to a customized MCS 104, e.g., using Table 1 (or Table 7.1.7.1-1 in 3GPP TS 36.213). The customized MCS 104, customized TBS 106 pair may then be selected and/or signaled to the UE 102, e.g., explicitly or implicitly. The customized MCS 104, customized TBS 106 pair may also be used to communicate with the UE 108 in the current TTI, e.g., in a downlink subframe 110 or the DwPTS portion of special subframe 112.

Furthermore, although they are described for downlink TDD LTE systems, the systems and methods for selecting an MCS and a TBS may be used in other systems. For example, the improved MCS and TBS selection may be used on the uplink in an frequency-division duplexing (FDD) LTE implementation to lessen the impact of sounding reference signals (SRSs) on physical uplink shared channel (PUSCH) performance.

FIG. 1B is a block diagram illustrating an example Citizens Broadband Radio service (CBRS) system 101. The system 101 may be a Citizens Broadband Radio Service (CBRS) system that includes a spectrum access system (SAS) 103, one or more Citizens Broadband Radio Service devices (CBSDs) 109A-N, and one or more user equipments (UEs) 108A-B. The CBSDs 109 and UEs 108 in the system 101 may be capable of transmitting and receiving in the entire 3.5 GHz band, even if they are not deployed in that manner. In some configurations, the base station 102 of the present systems and methods may be implemented as a CBSD 109 in a CBRS system 101.

Citizens Broadband Radio service (CBRS) is a tiered commercial radio service in 3.5 GHz in the U.S. Channels are allocated within and across tiers. These tiers can include, in order of priority, (1) incumbent licensees; (2) Priority Access (PA) licensees; and (3) General Authorized Access (GAA) operators. Portions of spectrum that are not continuously used by an incumbent licensee can be allocated to the secondary users—that is, PA licensees and GAA operators.

The SAS 103 may be an FCC-mandated function that assigns unlicensed spectrum in a geographical area. The SAS 103 may be implemented with one or more processors in one or more physical devices. The SAS 103 may optionally be coupled to an FCC database 113 that includes data used by the SAS 103 during spectrum allocation. The SAS 103 may limit the maximum power of CBSDs 109 to perform interference mitigation between tiers. The SAS 103 may also remove CBSD(s) 109 from a communication channel, i.e., the SAS 103 may instruct CBSD(s) 109 to suspend transmission or move to a different frequency channel. As discussed below, the SAS 103 may control the grants assigned to the CBSDs 109 in the system 101 to prevent excess interference at the ESC 114, which could prevent the ESC 114 from detecting offshore RADAR signals.

Since the CBRS band is open spectrum, it can be used by different devices operating according to different wireless protocols, e.g., CBRS devices, Wireless Internet Service Providers Association (WISPA) devices, Wi-Fi devices, etc. In order to enable coexistence between various devices (CBRS or otherwise) using CBRS spectrum in the system 101, the SAS 103 may assign the CBRS spectrum in a way that protects users from lower levels. For example, when an incumbent (Tier 1) licensee transmits, the SAS 103 may prevent lower-tiered users, such as Priority Access Licensees (PAL) and General Authorized Access (GAA) operators, from transmitting.

Each CBSD 109 may be a device that provides wireless (e.g., Long Term Evolution (LTE), 5G, etc.) service to one or more user equipments (UEs) 108 in a surrounding geographical area. The CBSDs 109 may alternatively be referred to as "enhanced Node Bs," "eNBs," "small cells," radio service devices," etc. In one configuration, the CBSDs 109A-C may be coupled to the SAS 103 via an optional domain proxy 107. Alternatively, a CBSD 109N may be coupled to the SAS 103 without an intervening domain proxy 107. In any case, the CBSDs 109 may be communicatively coupled to the SAS 103, e.g., using one or more Ethernet connections. The CBSDs 109 may be PAL and/or GAA users. The system 101 may include any number of CBSDs 109 that are preferably physically separated based on a variety of factors, e.g., propagation paths between CBSD 109 and UE 108, location density of UEs 108, and/or proximity to ESC(s) 114.

CBSDs 109 operating in the CBRS band may be required to register with the SAS 103 and provide their location and other details to the SAS 103. The SAS 103 may then assign a set of RF channels that the PAL and GAA users can access.

In some configurations, the UEs 108 may be LTE UEs that are additionally certified by the CBRS Alliance. The UEs 108 may wait for authorization from a nearby CBSD 109 before transmitting in the CBRS band.

Figure 2A:
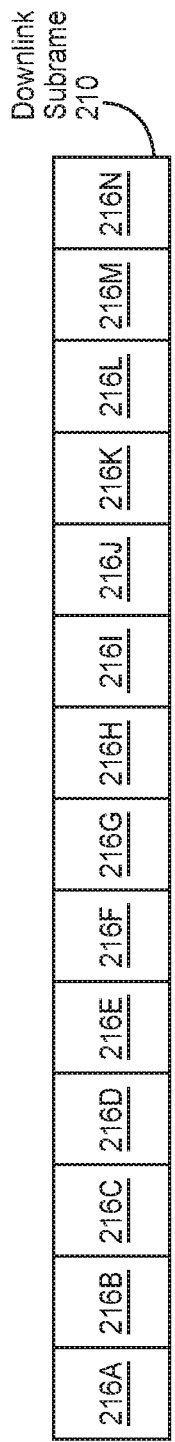
FIG. 2A is a block diagram illustrating an example downlink subframe.

FIG. 2A is a block diagram illustrating an example (normal) downlink subframe 210. The downlink subframe 210 may include 14 symbols 216A-N allocated between control data (e.g., physical downlink control channel (PDCCH) data or physical HARQ indicator channel (PHICH) data) and physical downlink shared channel (PDSCH) data. Control data may occupy the first 1, 2, or 3 of the symbols 216A-N in the downlink subframe 210 depending on the amount of control data the base station 102 has to transmit to the UE 108. The number of symbols 216A-N used by control data may be indicated by a CFI parameter that is transmitted to the UE 108 separately, e.g., on a physical control format indicator channel (PCFICH).

Figure 2B:
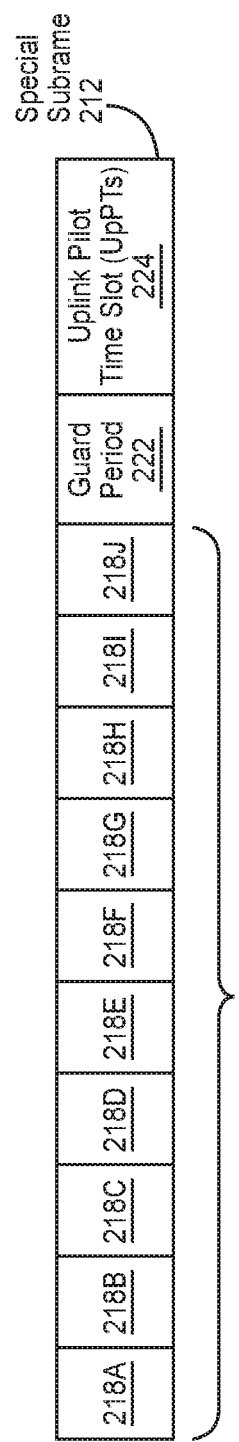
FIG. 2B is a block diagram illustrating an example special subframe.

FIG. 2B is a block diagram illustrating an example special subframe. The terms "subframe" and "TTI" may be used interchangeably herein to refer to a portion of a frame. The special subframe 212 may be used when transitioning from a downlink subframe 110 to an uplink subframe 114. The special subframe 212 may have three portions: a downlink pilot time slot (DwPTS) 220, a guard period (GP) 222, and an uplink pilot time slot (UpPTS) 224. There may be multiple (e.g., nine) different possible special subframe configurations. The DwPTS 220, GP 222, and UpPTS 224 may each have configurable lengths, depending on the special subframe configuration, for a total length of 1 ms (14 symbols). In the illustrated configuration, the DwPTS 220 includes 10 symbols, leaving 4 symbols to be allocated between the GP 222 and the UpPTS 224. Like the downlink subframe 210, the DwPTS 220 may carry control data and PDSCH reference symbols. The UpPTS 224 may carry sounding reference signals (SRS) from UE.

The GP 222 may be used to control the switching between downlink and uplink transmissions. Specifically, the GP 222 may compensate for a small hardware delay in the base station 102 and/or the UE 108 that is triggered when transitioning between transmission directions. The GP 222 may also prevent (or limit) interference between downlink transmissions (e.g., delayed from propagation) and uplink transmissions.

Figure 3:
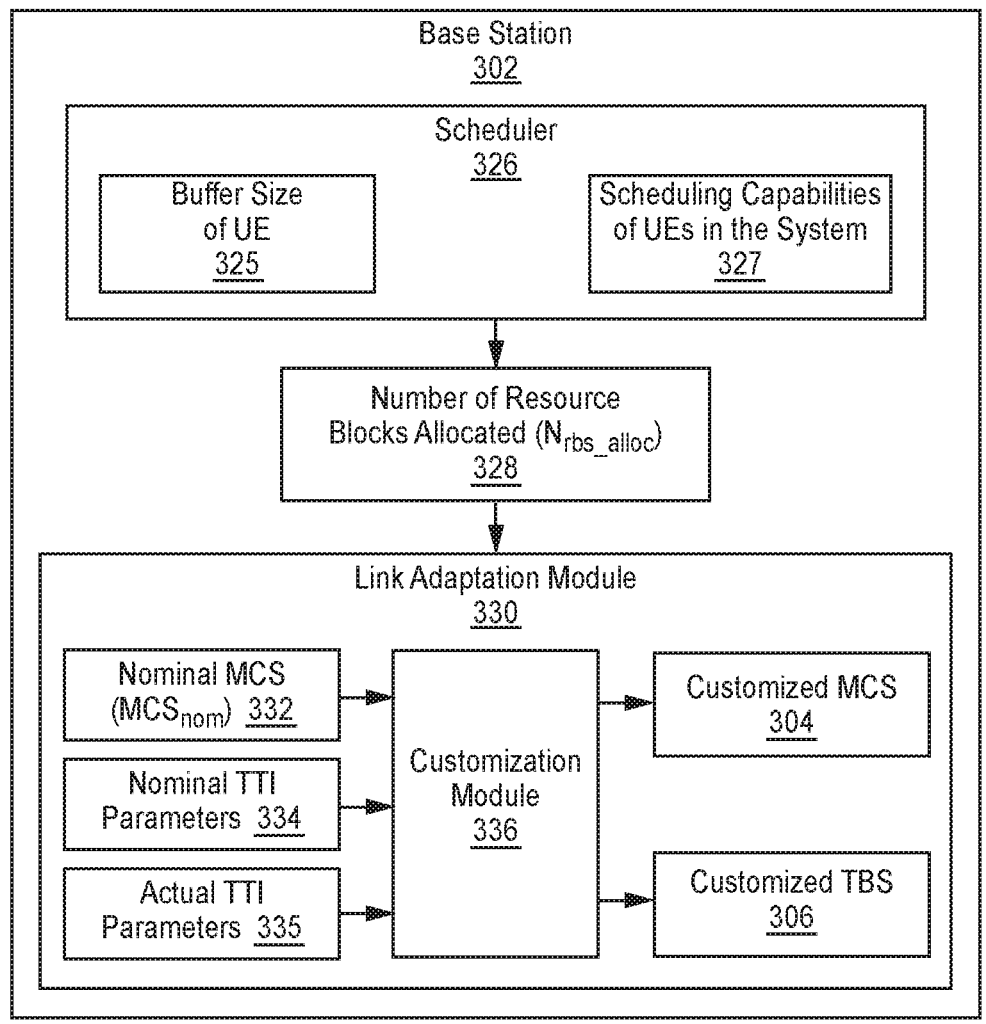
FIG. 3 is a block diagram illustrating an example base station used in the system of FIG. 1A for selecting an MCS and a TBS in LTE.

FIG. 3 is a block diagram illustrating an example base station 302 used in the system 100 of FIG. 1A for selecting an MCS and a TBS in LTE.

The base station 302 may include a scheduler 326 that produces a number of resource blocks allocated ($N_{rbs\_alloc}$) 328 value for the UE 108 based on the buffer size of the UE 325 and the scheduling capabilities of UEs in the system 327. Specifically, the RBs may be allocated based on the buffer size 325 of a UE of interest, the buffer size of other UEs 108 selected according to priority in a given TTI for scheduling, and/or on reuse groupings and priorities, etc. The UEs 108 may also be allocated RBs with the constraint that the sum of allocated RBs does not exceed available RBs for the bandwidth and/or the applicable reuse factor.

The base station 302 may also include a link adaptation module 330. The link adaptation module 330 may include a customization module 336. The customization module 336 may use a nominal MCS ($MCS_{nom}$) 332, nominal TTI parameters 334, actual TTI parameters 335, and the number of resource blocks allocated ($N_{rbs\_alloc}$) 328 to produce a customized MCS 304 and a customized TBS 306.

The customization module 336 may determine a scaled number of resource blocks allocated ($N'_{rbs\_alloc}$), e.g., using Equation (1):

$$N'\text{rbs\_alloc} = \begin{cases} \max\{\text{floor}(\text{Nrbs\_alloc}*.75), 1\}, & TTI \text{ is } SSF, \\ \text{Nrbs\_alloc}, & \text{otherwise} \end{cases}$$

where $N_{rbs\_alloc}$ is the number of resource blocks allocated (e.g., by the scheduler 326) to the UE 108. Furthermore, for a given MCS, let $TBS_{nom}(Itbs)$ in Equation (2) below represent the nominal TBS per resource block ($TBS_{nom}$) averaged over Nrbs_alloc=1, 2, . . . , 110, e.g., in Table 3. Equation (2) may be used to determine a target TBS ($TBS_{target}$):

$$TBS_{target} = TBS_{nom}(I_{tbs}(MCS_{nom}))*N_{rbs\_alloc}*((X-CFI)*12-Y)/((X_0-CFI_0)*12-Y_0),$$

where CFI is the CFI used for the TTI, X is the number of symbols in the TTI, and Y is the number of reference symbols per resource block in PDSCH symbols. Note that X=10 and Y=8 if the TTI is a special subframe 112, and X=14 and Y=12 otherwise. The values for the nominal number of symbols in a TTI ($X_0$), nominal CFI ($CFI_0$), and nominal number of reference symbols per resource block in PDSCH symbols ($Y_0$) may be 14, 2, and 12, respectively.

The scaling in Equation (2) (i.e., $((X-CFI)*12-Y)/((X_0-CFI_0)*12-Y_0)$) may account for the difference in the number of PDSCH data resource elements for the current TTI, compared to a nominal normal subframe TTI with $CFI=CFI_0=2$.

If $T(I_{tbs})$ represents the column in Table 3 corresponding to $N'_{rbs\_alloc}$, the value for $I_{tbs}$ that is actually used in the TTI may be given by Equation (3):

$$I_{tbs\_used} = \text{argmin}_{Itbs}|T(I_{tbs})-TBS_{target}|$$

where the argmin operator produces an $I_{tbs}$ corresponding to a TBS value that has a minimum difference with $TBS_{target}$. The base station 302 may also determine the customized TBS ($TBS_{cust}$) 306 using Equation (4):

$$TBS_{cust} = T(I_{tbs\_used}).$$

The base station 302 may also determine the customized MCS ($MCS_{cust}$) 304 using Equation (5):

$$MCS_{cust} = \text{Min}\{mcs:Itbs(mcs) = I_{tbs\_used}\}.$$

Determining and using the customized MCS 304 and the customized TBS 306 may result in less variation in rate-efficiency vs the nominal MCS ($MCS_{nom}$) 332 for both normal subframes 110 and special subframes 112.

Figure 4:
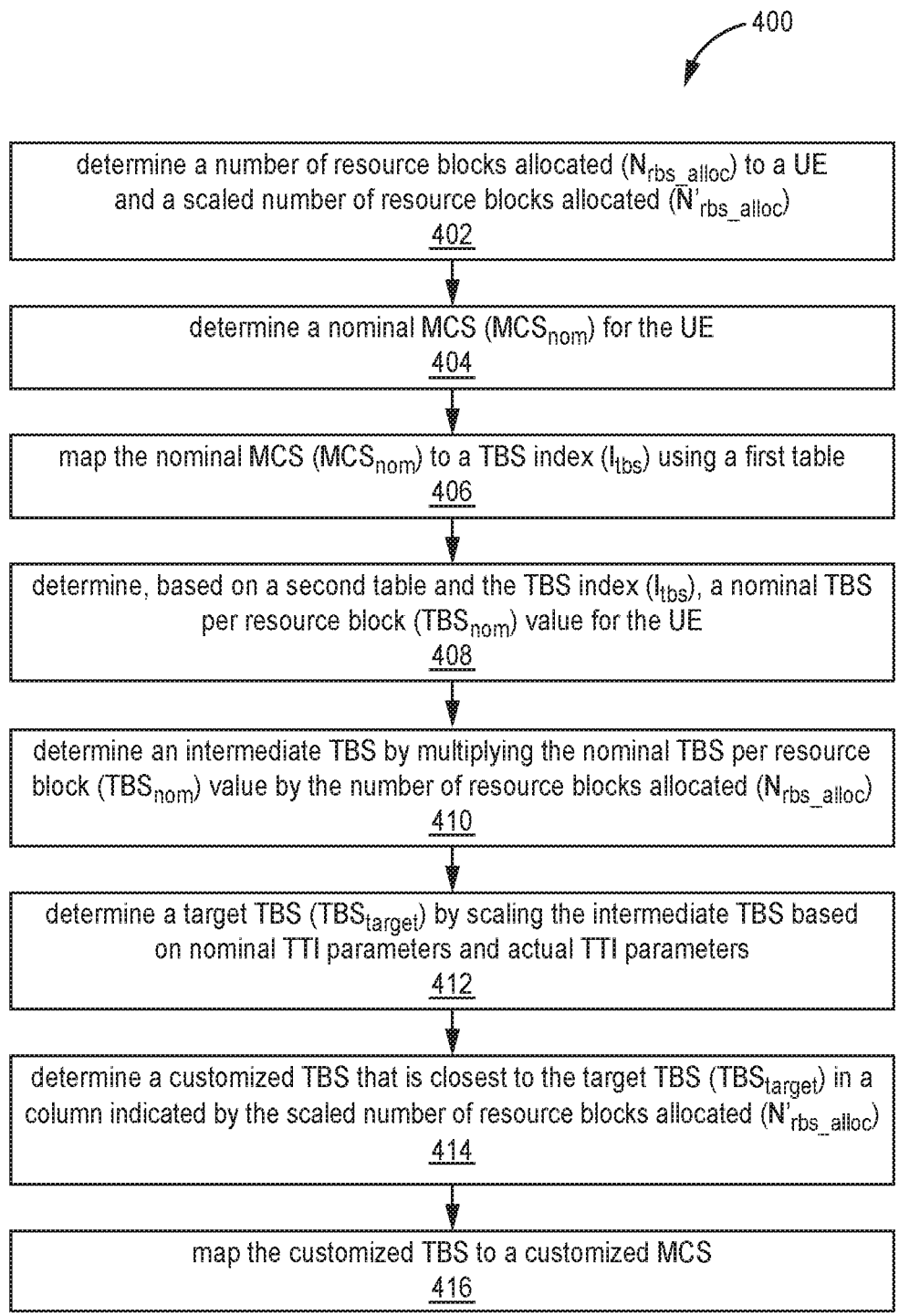
FIG. 4 is a high-level flow chart illustrating one exemplary embodiment of a method for selecting an MCS and a TBS in LTE.

FIG. 4 is a high-level flow chart illustrating one exemplary embodiment of a method 400 for selecting an MCS and a TBS in LTE. The embodiment of method 400 shown in FIG. 4 is described here as being implemented in base station 102 in the LTE system 100 of FIG. 1A, though it is to be understood that other embodiments can be implemented in other ways.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

The base station 102 may determine 402 a number of resource blocks allocated ($N_{rbs\_alloc}$) to a UE 108 and a scaled number of resource blocks allocated ($N'_{rbs\_alloc}$). This may include a scheduler 326 determining a number of resource blocks allocated ($N_{rbs\_alloc}$) to a UE 108, e.g., based on the buffer size of the UE 325 and/or scheduling capabilities of UEs in the system 327. Specifically, the RBs may be allocated based on the buffer size 325 of a UE of interest, the buffer size of other UEs 108 selected according to priority in a given TTI for scheduling, and/or on reuse groupings and priorities, etc. The UEs 108 may also be allocated RBs with the constraint that the sum of allocated RBs does not exceed available RBs for the bandwidth and/or the applicable reuse factor. The base station 302 may determine the scaled number of resource blocks allocated ($N'_{rbs\_alloc}$) using Equation (1) above. It should be noted that $N'_{rbs\_alloc} = N_{rbs\_alloc}$ for normal subframes.

The base station 102 may also determine 404 a nominal MCS ($MCS_{nom}$) 332 for the UE 108. The nominal MCS ($MCS_{nom}$) 332 may be determined based on channel quality indicators (CQIs) reported by the UE 108. Specifically, to determine the MCSnom, the base station 102 may use an SINRnom for each MCS. Each SINRnom may be the (weighted average) SINR required for a target (e.g., 10%) BLER, using that MCS with the nominal parameters $X_0$, $CFI_0$, and $Y_0$, i.e., nominal number of symbols in the TTI ($X_0$), nominal control format indicator ($CFI_0$), and number of reference symbols per resource block in PDSCH symbols ($Y_0$). The SINRs may be averaged across Nrbs=1, . . . , 110, and may be weighted. The CQI reports received from the UE 108 may be considered as quantized versions of MCSnom, and can be mapped to MCSnom directly, or mapped to a corresponding SINRest=SINRnom, with link adaptation making more frequent adjustments to SINRest based on the sequence of N/ACKs, to achieve target BLER.

The base station 102 may also map 406 the nominal MCS ($MCS_{nom}$) 332 to a TBS index ($I_{tbs}$) using a first table. For example, the base station 102 may use the nominal MCS ($MCS_{nom}$) 332 as an index in Table 1 (or Table 7.1.7.1-1 in 3GPP TS 36.213) to determine a corresponding TBS index ($I_{tbs}$).

The base station 102 may also determine 408, based on a second table and the TBS index ($I_{tbs}$), a nominal TBS per resource block ($TBS_{nom}$) value for the UE 108. For example, the base station 102 may use the TBS index ($I_{tbs}$) to determine a corresponding nominal TBS per resource block ($TBS_{nom}$) value in Table 2. The nominal TBS per resource block ($TBS_{nom}$) value may be represented by the following term in Equation (2): $TBS_{nom}(I_{tbs}(MCS_{nom}))$. As discussed above in connection with FIG. 1A, Table 2 may be derived by averaging the TBSs per resource block allocated for a given TBS index ($I_{tbs}$) in Table 3.

The base station 102 may also determine 410 an intermediate TBS by multiplying the nominal TBS per resource block ($TBS_{nom}$) value by the number of resource blocks allocated ($N_{rbs\_alloc}$). Therefore, the intermediate TBS may be represented by the following term in Equation (2): $TBS_{nom}(I_{tbs}(MCS_{nom}))*N_{rbs\_alloc}$.

The base station 102 may also determine 412 a target TBS ($TBS_{target}$) by scaling the intermediate TBS based on nominal TTI parameters 334 and actual TTI parameters 335. Actual TTI parameters 335 may include the CFI used for the TTI (CFI), the number of symbols in the TTI (X), and the number of reference symbols per resource block in PDSCH symbols (Y). Nominal TTI parameters 334 used to scale the intermediate TBS into the target TBS ($TBS_{target}$) may include $X_0=14$, $CFI_0=2$, and $Y_0=12$. The scaling may be performed by the right side of Equation (2) above, i.e., multiplying the intermediate TBS by $((X-CFI)*12-Y)/((X_0-CFI_0)*12-Y_0)$.

The base station 102 may also determine 414 a customized TBS 106 that is closest to the target TBS ($TBS_{target}$) in a column indicated by the scaled number of resource blocks allocated ($N'_{rbs\_alloc}$), e.g., in Table 3 or Table 7.1.7.2.1-2 in 3GPP TS 36.213. This determination 414 may include selecting a column, in a lookup table with an entry for each of the plurality of predefined TBSs (e.g., Table 3 or Table 7.1.7.2.1-2 in 3GPP TS 36.213), based on the scaled number of resource blocks allocated (($N'_{rbs\_alloc}$) to the UE. The base station 102 may then determine the customized TBS 106 as being one of the plurality of predefined TBSs (e.g., Table 3 or Table 7.1.7.2.1-2 in 3GPP TS 36.213) that is closest to the target TBS in the selected column.

This determination 414 may ensure that a customized TBS 106 is selected that is closest to the target TBS ($TBS_{target}$) since a UE can only accept one of the predefined TBSs in Table 3 or Table 7.1.7.2.1-2 in 3GPP TS 36.213. In other words, the selecting a customized TBS 106 that is not present in Table 7.1.7.2.1-2 in 3GPP TS 36.213 may cause an error within the base station 102 and/or UE 108, the determination 414 may ensure that the customized TBS 106 is one of the acceptable TBSs in Table 7.1.7.2.1-2 in 3GPP TS 36.213.

The base station 102 may then map 416 the customized TBS 106 to a customized MCS 104, e.g., using Table 1 (or Table 7.1.7.1-1 in 3GPP TS 36.213). The customized MCS 104, customized TBS 106 pair may then be selected and used in the current TTI to communicate to the UE 108. Tables 1, 2 and/or 3 may each be derived and/or stored during or before the method 400 illustrated in FIG. 4 is performed.

Figure 5:
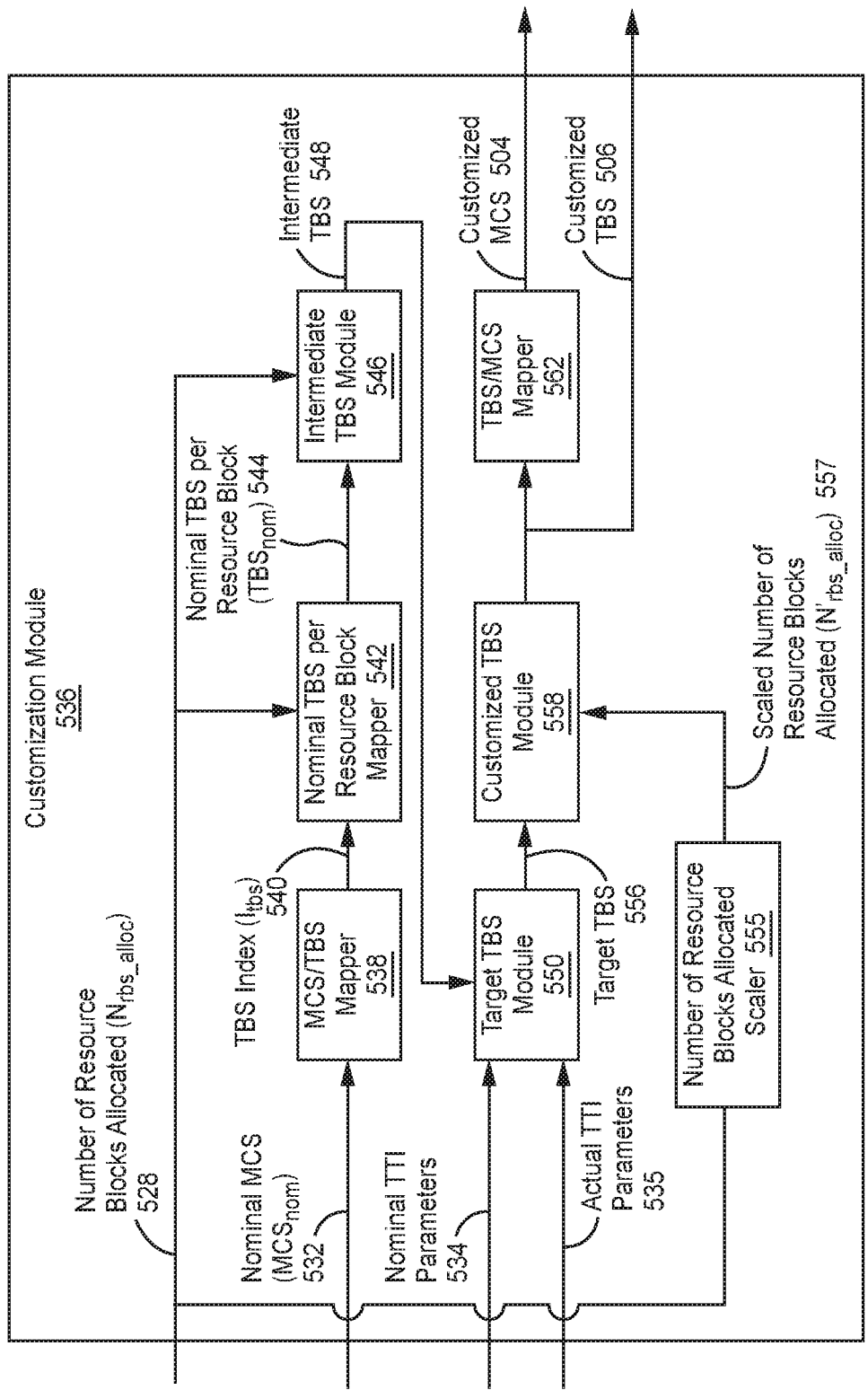
FIG. 5 is a block diagram illustrating an exemplary customization module used in the base station of FIG. 3.

FIG. 5 is a block diagram illustrating an exemplary customization module 536 used in the base station 302 of FIG. 3. The customization module 536 may perform some or all of the method 400 described in FIG. 4.

The customization module 536 may receive the following inputs: a number of resource blocks allocated ($N_{rbs\_alloc}$) 528, a nominal MCS ($MCS_{nom}$) 532, nominal TTI parameters 534 and actual TTI parameters 535. The customization module 536 may produce a customized MCS 504 and a customized TBS 506 as outputs. This may include using an MCS/TBS mapper 538, a nominal TBS per resource block mapper 542, an intermediate TBS module 546, a target TBS module 550, a number of resource blocks allocated scaler 555, a customized TBS module 558 and/or a TBS/MCS mapper 562.

The MCS/TBS mapper 538 may receive the nominal MCS 532 as input and produce a TBS index ($I_{tbs}$) 540, e.g., using Table 1 (or Table 7.1.7.1-1 in 3GPP TS 36.213). The nominal TBS per resource block mapper 542 may map the TBS index ($I_{tbs}$) 540 into a nominal TBS per resource block ($TBS_{nom}$) 544, e.g., using Table 2 above. The nominal TBS per resource block module 542 may determine the following term in Equation (2): $TBS_{nom}(I_{tbs}(MCS_{nom}))$.

The intermediate TBS module 546 may determine an intermediate TBS 548 by multiplying the nominal TBS per resource block ($TBS_{nom}$) 544 by the number of resource blocks allocated ($N_{rbs\_alloc}$) 528. Therefore, the intermediate TBS module 546 may implement the following portion of Equation (2): $TBS_{nom}(I_{tbs}(MCS_{nom}))*N_{rbs\_alloc}$.

The target TBS module 550 may determine a target TBS ($TBS_{target}$) 556 by scaling the intermediate TBS 548 using nominal TTI parameters 534 and actual TTI parameters 535. Actual TTI parameters 535 may include the CFI used for the TTI (CFI), the number of symbols in the TTI (X), and the number of reference symbols per resource block in PDSCH symbols (Y). Nominal TTI parameters 534 used to scale the intermediate TBS 548 into the target TBS ($TBS_{target}$) 556 may include $X_0=14$, $CFI_0=2$, and $Y_0=12$. Therefore, in Equation (2) above, the target TBS module 550 may multiply the intermediate TBS 548 by the following term: $((X-CFI)*12-Y)/((X_0-CFI_0)*12-Y_0)$.

The number of resource blocks allocated scaler 555 may scale the number of resource blocks allocated ($N_{rbs\_alloc}$) 528 to produce a scaled number of resource blocks allocated ($N'_{rbs\_alloc}$) 557, e.g., according to Equation (1). The customized TBS module 558 may determine a customized TBS 506 that is closest to the target TBS ($TBS_{target}$) 556 in a column (e.g., in Table 3) indicated by the scaled number of resource blocks allocated ($N'_{rbs\_alloc}$) 557. This may force the customized TBS 506 to one of the predefined TBS entries in (Table 3) that is closest to the target TBS ($TBS_{target}$) 556 since a UE 108 may only accept one of the predefined TBS entries in Table 3.

The TBS/MCS mapper 562 may map the customized TBS 506 to the customized MCS 504. Although the MCS/TBS mapper 538 and the TBS/MCS mapper 562 are illustrated as different modules, they may both be implemented with a table lookup in Table 1 (or Table 7.1.7.1-1 in 3GPP TS 36.213). The customized MCS 504, customized TBS 506 pair may then be selected and used for the UE 108.

Figure 6:
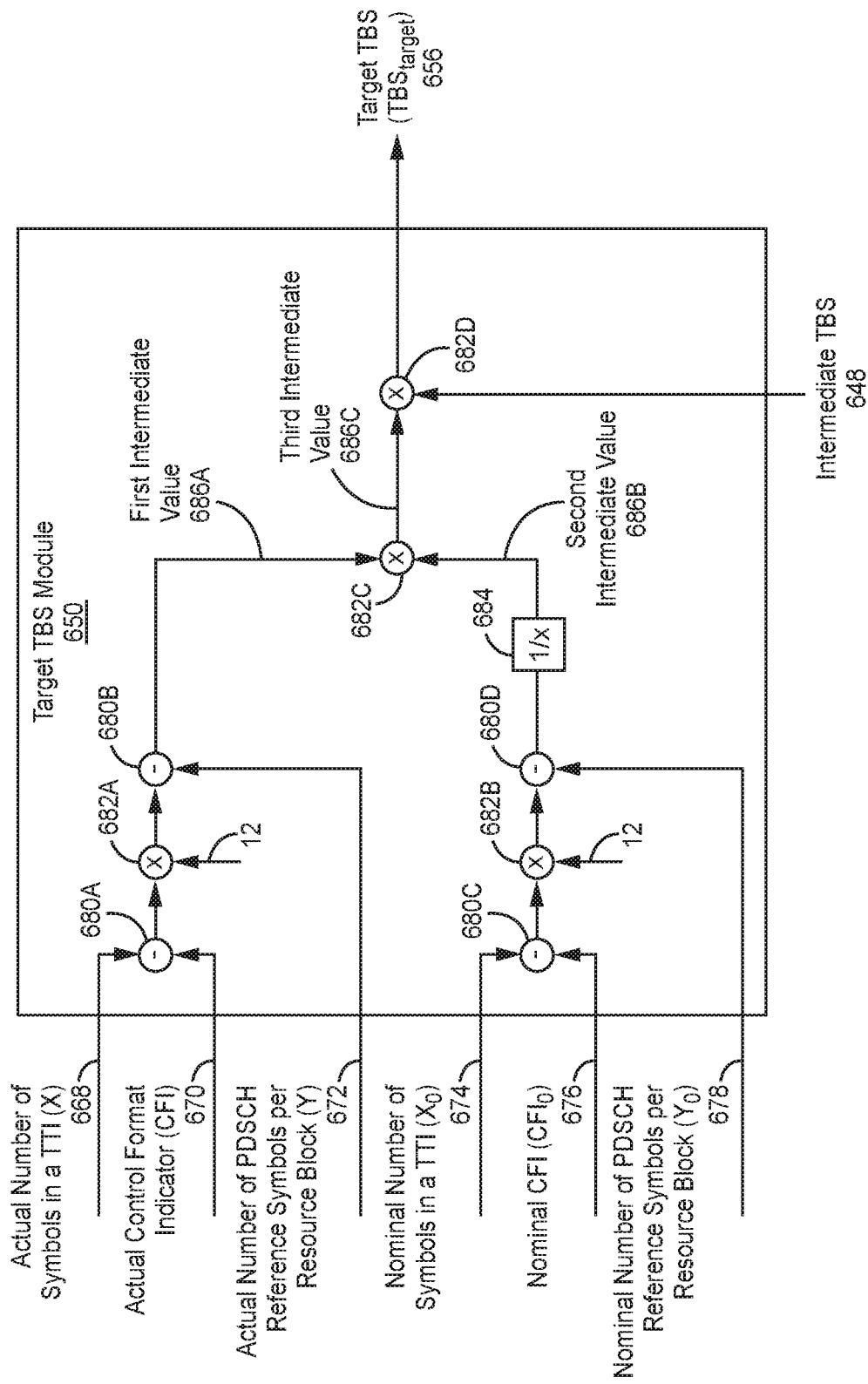
FIG. 6 is a block diagram illustrating an exemplary target TBS module used in the customization module of FIG. 5.

FIG. 6 is a block diagram illustrating an exemplary target TBS module 650 used in the customization module 536 of FIG. 5. The target TBS module 650 may perform portions of the method 400 described in FIG. 4.

The target TBS module 650 may receive the following actual TTI parameters 535 as inputs: the actual number of symbols in the TTI (X) 668, the actual CFI used for the TTI (CFI) 670, and the actual number of PDSCH reference symbols per resource block (Y) 672. The target TBS module 650 may receive the following nominal TTI parameters 534 as inputs: a nominal number of symbols in a TTI ($X_0$) 674, a nominal CFI used for a TTI ($CFI_0$) 676, and a nominal number of PDSCH reference symbols per resource block ($Y_0$) 678. For example, the values used for the nominal TTI parameters 534 may be: $X_0=14$, $CFI_0=2$, and $Y_0=12$. In addition to the actual TTI parameters 535 and the nominal TTI parameters 534, the target TBS module 650 may use an intermediate TBS 648 to determine a target TBS ($TBS_{target}$) 656, e.g., as shown in Equation (2). This may include using at least one of the following: summer(s) 680A-D, multiplier(s) 682A-D, and an inverse module 684. It should be noted that the summers 682A-D illustrated in FIG. 6 may determine differences between two inputs, not sums. Elements 680A-D, 682A-D and 684 may be implemented with any combination of hardware, software, and/or firmware to perform the function indicated inside each element, i.e., subtraction for "−", multiplication for "×", or taking an inverse of an input for "1/x".

The target TBS module 650 may subtract the CFI 670 from X 668, and multiply the difference by 12, e.g., (X−CFI)*12. The target TBS module 650 may also subtract Y from the resulting product to produce a first intermediate value 686A, e.g., ((X−CFI)*12−Y).

The target TBS module 650 may also subtract the $CFI_0$ 676 from $X_0$ 674, and multiply the difference by 12, e.g., ($X_0$−$CFI_0$)*12. The target TBS module 650 may also subtract $Y_0$ 678 from the resulting product and take the inverse of the difference to produce a second intermediate value 686B, e.g., $1/(($X_0$−$CFI_0$)*12−$Y_0$)$.

The target TBS module 650 may also multiply the first intermediate value 686A with the second intermediate value 686B to produce a third intermediate value 686C. The target TBS module 650 may also multiply the third intermediate value 686C with the intermediate TBS 648 to produce the target TBS ($TBS_{target}$) 656.

Computer System Overview

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Figure 7:
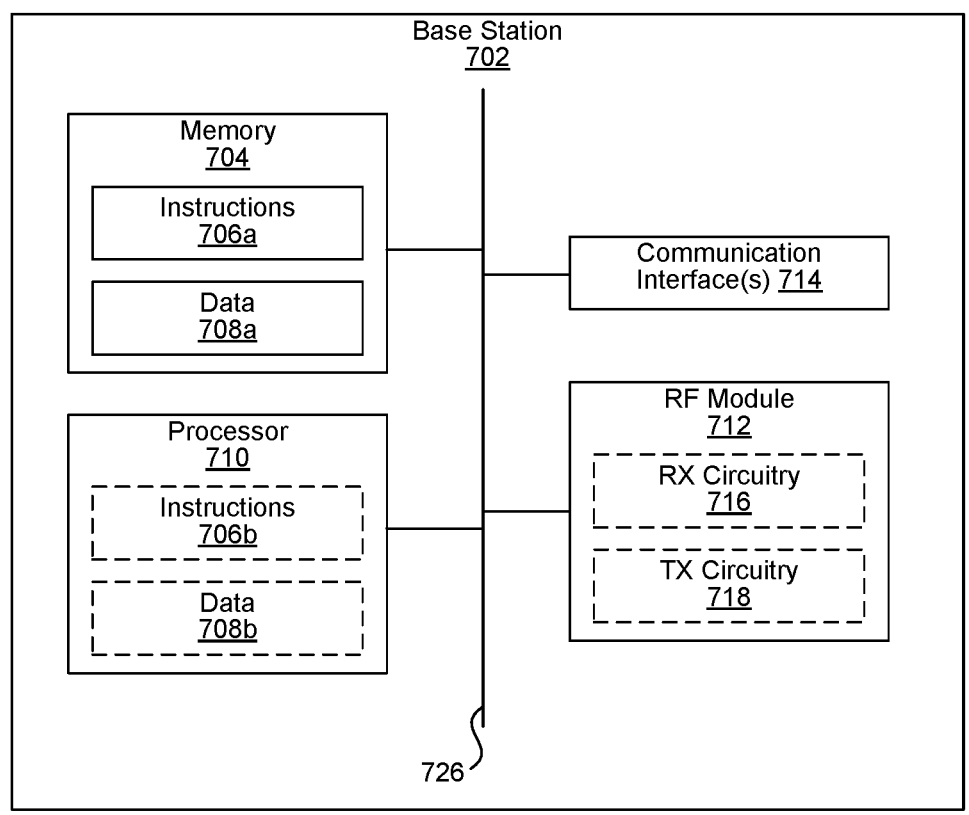
FIG. 7 is a block diagram illustrating an example of a base station that may utilize some embodiments of the present disclosure.

As such, FIG. 7 is a block diagram illustrating an example of a base station 702 that may utilize some embodiments of the present disclosure. The illustrated components may be located within the same physical structure or in separate housings or structures. The base station 102 described in connection with FIG. 1A may be implemented in accordance with one or more of the base stations 702 described in FIG. 7. The base station 702 includes a processor 710. The processor 710 may be a general purpose single- or multi-chip microprocessor (e.g., an ARM), a special purpose microprocessor (e.g., a digital signal processor (DSP)), a microcontroller, a programmable gate array, etc. The processor 710 may be referred to as a central processing unit (CPU). Although just a single processor 710 is shown in the base station 702 of FIG. 7, in an alternative configuration, a combination of processors (e.g., an ARM and DSP) could be used.

The base station 702 also includes memory 704 in electronic communication with the processor 710. That is, the processor 710 can read information from and/or write information to the memory 704. The memory 704 may be any electronic component capable of storing electronic information. The memory 704 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 708a and instructions 706a may be stored in the memory 704. The instructions 706a may include one or more programs, routines, sub-routines, functions, procedures, etc. The instructions 706a may include a single computer-readable statement or many computer-readable statements. The instructions 706a may be executable by the processor 710 to implement one or more of the methods, functions and procedures described above. Executing the instructions 706a may involve the use of the data 708a that is stored in the memory 704. FIG. 7 shows some instructions 706b and data 708b being loaded into the processor 710 (which may come from instructions 706a and data 708a).

The base station 702 may also include one or more communication interfaces 712 for communicating with other base stations. The communication interfaces 712 may be based on wired communication technology, wireless communication technology, or both. Examples of different types of communication interfaces 712 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The base station 702 may also include an RF module 712 with RX circuitry 716 and transmit circuitry 718. The RX circuitry 716 may include circuitry configured to receive wireless RF signals. The transmit circuitry 718 may include circuitry configured to transmit wireless RF signals.

The various components of the base station 702 may be coupled together by one or more buses, which may include a power bus, a control signal bus, a status signal bus, a data bus, etc. For simplicity, the various buses are illustrated in FIG. 7 as a bus system 726. Furthermore, various other architectures and components may be utilized in connection with any base stations described herein.

Terminology

Brief definitions of terms, abbreviations, and phrases used throughout this application are given below.

The term "determining" may include calculating, computing, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on".

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The terms "responsive" or "in response to" may indicate that an action is performed completely or partially in response to another action.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks. The transmission medium used by a network may include coaxial cable, fiber optic cable, twisted pair, digital subscriber line (DSL), or combinations thereof. Wireless networks may also use air as a transmission medium.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The techniques introduced here may be embodied as special-purpose hardware (such as circuitry), as programmable circuitry appropriately programmed with software and/or firmware, or as a combination of special-purpose and programmable circuitry. Hence, embodiments may include a machine-readable medium (also referred to as a computer-readable medium) having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. The machine-readable medium may be tangible and non-transitory.

In conclusion, the present disclosure provides novel systems, methods, and arrangements for selecting an MCS and a TBS in LTE. While detailed descriptions of one or more embodiments of the disclosure have been given above, various alternatives, modifications, and equivalents will be apparent to those skilled in the art without varying from the spirit of the disclosure. For example, while the embodiments described above refer to particular features, functions, procedures, components, elements, and/or structures, the scope of this disclosure also includes embodiments having different combinations of features, functions, procedures, components, elements, and/or structures, and embodiments that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

EXAMPLE EMBODIMENTS

Example 1 includes a base station for selecting a modulation and coding scheme (MCS) and a total block size (TBS) for a user equipment (UE), comprising: a processor; memory in electronic communication with the processor; and instructions stored in memory, the instructions being executable to: map a nominal modulation and coding scheme (MCS) to a total block size (TBS) index; determine a nominal TBS per resource block value based on the TBS index; determine a target TBS based on the nominal TBS per resource block value and a number of resource blocks allocated to the UE; determine a customized TB S, from a plurality of predefined TBSs, that is closest to the target TBS; map the customized TBS to a customized MCS; and use the customized TBS and the customized MCS to transmit to the UE during a downlink transmission time interval (TTI).

Example 2 includes the base station of Example 1, wherein the instructions executable to determine the target TBS comprise instructions executable to: determine an intermediate TBS by multiplying the nominal TBS per resource block value by the number of resource blocks allocated to the UE; and scale the intermediate TBS based on nominal transmission time interval (TTI) parameters and actual TTI parameters.

Example 3 includes the base station of Example 2, wherein the nominal TTI parameters comprise a nominal number of symbols in a nominal TTI, a control format indicator (CFI) for the nominal TTI, and a nominal number of physical data shared channel (PDSCH) reference symbols per resource block; and wherein the actual TTI parameters comprise a number of symbols in the downlink TTI, an actual CFI used for the downlink TTI, and an actual number of PDSCH reference symbols per resource block.

Example 4 includes the base station of any of Examples 1-3, wherein mapping the nominal MCS to the TBS index comprises using the nominal MCS as a first index in a first lookup table; wherein determining the nominal TBS per resource block value comprises using the TBS index as a second index in a second lookup table; and wherein mapping the customized TBS to the customized MCS comprises using the customized TBS as a third index in the first lookup table.

Example 5 includes the base station of any of Examples 1-4, wherein a second lookup table comprises the TBS index and a plurality of other TBS indices, wherein the second lookup table further comprises the nominal TBS per resource block value and a plurality of other nominal TBS per resource block values, wherein the TBS index is associated with the nominal TBS per resource block value in the second lookup table; and wherein determining the nominal TBS per resource block value comprises using the TBS index as a second index in the second lookup table.

Example 6 includes the base station of Example 5, wherein the instructions executable to determine the customized TBS comprise instructions executable to: select a column in a third lookup table based on a scaled number of resource blocks allocated to the UE, wherein the third lookup table comprises an entry for each of the plurality of predefined TBSs; and select the customized TBS as being one of the plurality of predefined TBSs in the third lookup table that is closest to the target TBS in the selected column.

Example 7 includes the base station of Example 6, wherein the second lookup table is derived from the third lookup table; wherein the nominal TBS per resource block value in the second lookup table is determined by: dividing each predefined TBS, in a row indicated by the TBS index, by a corresponding number of resource blocks allocated; and averaging all the divided predefined TBSs in the row to produce the nominal TBS per resource block value.

Example 8 includes the base station of any of Examples 6-7, further comprising instructions executable to scale the number of resource blocks allocated to the UE by Example 0.75, based on whether the downlink TTI is a special subframe, to produce the scaled number of resource blocks allocated to the UE.

Example 9 includes the base station of any of Examples 1-8, wherein the downlink TTI is a normal subframe or a downlink pilot time slot (DwPTS), wherein the downlink TTI carries control data and PDSCH data.

Example 10 includes the base station of any of Examples 1-9, wherein the base station and the UE operate in a Citizens Broadband Radio service (CBRS) system that implements a Long-Term Evolution (LTE) system using time-division duplexing (TDD).

Example 11 includes a method for selecting a modulation and coding scheme (MCS) and a total block size (TBS) for a user equipment (UE), wherein the method is performed by a base station, the method comprising: mapping a nominal modulation and coding scheme (MCS) to a total block size (TBS) index; determining a nominal TBS per resource block value based on the TBS index; determining a target TBS based on the nominal TBS per resource block value and a number of resource blocks allocated to the UE; determining a customized TBS, from a plurality of predefined TBSs, that is closest to the target TBS; mapping the customized TBS to a customized MCS; and using the customized TBS and the customized MCS to transmit to the UE during a downlink transmission time interval (TTI).

Example 12 includes the method of Example 11, wherein the determining the target TBS comprises: determining an intermediate TBS by multiplying the nominal TBS per resource block value by the number of resource blocks allocated to the UE; and scaling the intermediate TBS based on nominal transmission time interval (TTI) parameters and actual TTI parameters.

Example 13 includes the method of Example 12, wherein the nominal TTI parameters comprise a nominal number of symbols in a nominal TTI, a control format indicator (CFI) for the nominal TTI, and a nominal number of physical data shared channel (PDSCH) reference symbols per resource block; and wherein the actual TTI parameters comprise a number of symbols in the downlink TTI, an actual CFI used for the downlink TTI, and an actual number of PDSCH reference symbols per resource block.

Example 14 includes the method of any of Examples 11-13, wherein mapping the nominal MCS to the TBS index comprises using the nominal MCS as a first index in a first lookup table; wherein determining the nominal TBS per resource block value comprises using the TBS index as a second index in a second lookup table; and wherein mapping the customized TBS to the customized MCS comprises using the customized TBS as a third index in the first lookup table.

Example 15 includes the method of any of Examples 11-14, wherein a second lookup table comprises the TBS index and a plurality of other TBS indices, wherein the second lookup table further comprises the nominal TBS per resource block value and a plurality of other nominal TBS per resource block values, wherein the TBS index is associated with the nominal TBS per resource block value in the second lookup table; and wherein determining the nominal TBS per resource block value comprises using the TBS index as a second index in the second lookup table.

Example 16 includes the method of Example 15, wherein the determining the customized TBS comprises: selecting a column in a third lookup table based on a scaled number of resource blocks allocated to the UE, wherein the third lookup table comprises an entry for each of the plurality of predefined TBSs; and selecting the customized TBS as being one of the plurality of predefined TBSs in the third lookup table that is closest to the target TBS in the selected column.

Example 17 includes the method of Example 16, wherein the second lookup table is derived from the third lookup table; wherein the nominal TBS per resource block value in the second lookup table is determined by: dividing each predefined TBS, in a row indicated by the TBS index, by a corresponding number of resource blocks allocated; and averaging all the divided predefined TBSs in the row to produce the nominal TBS per resource block value.

Example 18 includes the method of any of Examples 16-17, further comprising scaling the number of resource blocks allocated by Example 0.75, based on whether the downlink TTI is a special subframe, to produce the scaled number of resource blocks allocated to the UE.

Example 19 includes the method of any of Examples 11-18, wherein the downlink TTI is a normal subframe or a downlink pilot time slot (DwPTS), wherein the downlink TTI carries control data and PDSCH data.

Example 20 includes the method of any of Examples 11-19, wherein the base station and the UE operate in a Citizens Broadband Radio service (CBRS) system that implements a Long-Term Evolution (LTE) system using time-division duplexing (TDD).

What is claimed is:

1. A base station for selecting a modulation and coding scheme (MCS) and a total block size (TBS) for a user equipment (UE), comprising:
    a processor;
    memory in electronic communication with the processor; and
    instructions stored in the memory, the instructions being executable to:
        map a nominal modulation and coding scheme (MCS) to a total block size (TBS) index;
        determine a nominal TBS per resource block value based on the TBS index;
        determine a target TBS by scaling the nominal TBS per resource block value based on at least a number of symbols in a downlink transmission time interval (TTI), an actual CFI used for the downlink TTI, and an actual number of physical data shared channel (PDSCH) reference symbols per resource block, and a number of resource blocks allocated to the UE;
        determine a customized TBS, from a plurality of predefined TBSs, that is closest to the target TBS;
        map the customized TBS to a customized MCS; and
        use the customized TBS and the customized MCS to transmit to the UE during the downlink TTI.

2. The base station of claim 1, wherein the scaling comprises:
    determining an intermediate TBS by multiplying the nominal TBS per resource block value by the number of resource blocks allocated to the UE; and
    scaling the intermediate TBS based on:
        nominal transmission time interval (TTI) parameters; and
        actual TTI parameters comprising the number of symbols in the downlink TTI, the actual CFI used for the downlink TTI, and the actual number of PDSCH reference symbols per resource block.

3. The base station of claim 2,
    wherein the nominal TTI parameters comprise a nominal number of symbols in a nominal TTI, a control format indicator (CFI) for the nominal TTI, and a nominal number of physical data shared channel (PDSCH) reference symbols per resource block.

4. The base station of claim 1,
    wherein mapping the nominal MCS to the TBS index comprises using the nominal MCS as a first index in a first lookup table;
    wherein determining the nominal TBS per resource block value comprises using the TBS index as a second index in a second lookup table; and
    wherein mapping the customized TBS to the customized MCS comprises using the customized TBS as a third index in the first lookup table.

5. The base station of claim 1,
    wherein a second lookup table comprises the TBS index and a plurality of other TBS indices,
    wherein the second lookup table further comprises the nominal TBS per resource block value and a plurality of other nominal TBS per resource block values,
    wherein the TBS index is associated with the nominal TBS per resource block value in the second lookup table; and
    wherein determining the nominal TBS per resource block value comprises using the TBS index as a second index in the second lookup table.

6. The base station of claim 5, wherein the instructions executable to determine the customized TBS comprise instructions executable to:
    select a column in a third lookup table based on a scaled number of resource blocks allocated to the UE, wherein the third lookup table comprises an entry for each of the plurality of predefined TBSs; and
    select the customized TBS as being one of the plurality of predefined TBSs in the third lookup table that is closest to the target TBS in the selected column.

7. The base station of claim 6,
    wherein the second lookup table is derived from the third lookup table;
    wherein the nominal TBS per resource block value in the second lookup table is determined by:
        dividing each predefined TBS, in a row indicated by the TBS index, by a corresponding number of resource blocks allocated; and
        averaging all the divided predefined TBSs in the row to produce the nominal TBS per resource block value.

8. The base station of claim 6, further comprising instructions executable to scale the number of resource blocks allocated to the UE by 0.75, based on whether the downlink TTI is a special subframe, to produce the scaled number of resource blocks allocated to the UE.

9. The base station of claim 1, wherein the downlink TTI is a normal subframe or a downlink pilot time slot (DwPTS), wherein the downlink TTI carries control data and PDSCH data.

10. The base station of claim 1, wherein the base station and the UE operate in a Citizens Broadband Radio service (CBRS) system that implements a Long-Term Evolution (LTE) system using time-division duplexing (TDD).

11. A method for selecting a modulation and coding scheme (MCS) and a total block size (TBS) for a user equipment (UE), wherein the method is performed by a base station, the method comprising:

mapping a nominal modulation and coding scheme (MCS) to a total block size (TB S) index;
determining a nominal TBS per resource block value based on the TBS index;
determining a target TBS by scaling the nominal TBS per resource block value based on at least a number of symbols in a downlink transmission time interval (TTI), an actual CFI used for the downlink TTI, and an actual number of physical data shared channel (PDSCH) reference symbols per resource block, and a number of resource blocks allocated to the UE;
determining a customized TBS, from a plurality of predefined TBSs, that is closest to the target TBS;
mapping the customized TBS to a customized MCS; and
using the customized TBS and the customized MCS to transmit to the UE during the downlink TTI.

12. The method of claim 11, wherein the scaling comprises:
determining an intermediate TBS by multiplying the nominal TBS per resource block value by the number of resource blocks allocated to the UE; and
scaling the intermediate TBS based on:
nominal transmission time interval (TTI) parameters; and
actual TTI parameters comprising the number of symbols in the downlink TTI, the actual CFI used for the downlink TTI, and the actual number of PDSCH reference symbols per resource block.

13. The method of claim 12,
wherein the nominal TTI parameters comprise a nominal number of symbols in a nominal TTI, a control format indicator (CFI) for the nominal TTI, and a nominal number of physical data shared channel (PDSCH) reference symbols per resource block.

14. The method of claim 11,
wherein mapping the nominal MCS to the TBS index comprises using the nominal MCS as a first index in a first lookup table;
wherein determining the nominal TBS per resource block value comprises using the TBS index as a second index in a second lookup table; and
wherein mapping the customized TBS to the customized MCS comprises using the customized TBS as a third index in the first lookup table.

15. The method of claim 11,
wherein a second lookup table comprises the TBS index and a plurality of other TBS indices,
wherein the second lookup table further comprises the nominal TBS per resource block value and a plurality of other nominal TBS per resource block values,
wherein the TBS index is associated with the nominal TBS per resource block value in the second lookup table; and
wherein determining the nominal TBS per resource block value comprises using the TBS index as a second index in the second lookup table.

16. The method of claim 15, wherein the determining the customized TB S comprises:
selecting a column in a third lookup table based on a scaled number of resource blocks allocated to the UE, wherein the third lookup table comprises an entry for each of the plurality of predefined TBSs; and
selecting the customized TBS as being one of the plurality of predefined TBSs in the third lookup table that is closest to the target TBS in the selected column.

17. The method of claim 16,
wherein the second lookup table is derived from the third lookup table;
wherein the nominal TBS per resource block value in the second lookup table is determined by:
dividing each predefined TBS, in a row indicated by the TBS index, by a corresponding number of resource blocks allocated; and
averaging all the divided predefined TBSs in the row to produce the nominal TBS per resource block value.

18. The method of claim 16, further comprising scaling the number of resource blocks allocated by 0.75, based on whether the downlink TTI is a special subframe, to produce the scaled number of resource blocks allocated to the UE.

19. The method of claim 11, wherein the downlink TTI is a normal subframe or a downlink pilot time slot (DwPTS), wherein the downlink TTI carries control data and PDSCH data.

20. The method of claim 11, wherein the base station and the UE operate in a Citizens Broadband Radio service (CBRS) system that implements a Long-Term Evolution (LTE) system using time-division duplexing (TDD).

* * * * *